(12) United States Patent
Stefansen

(10) Patent No.: US 7,155,266 B2
(45) Date of Patent: Dec. 26, 2006

(54) HINGE FOR FOLD PHONE

(75) Inventor: Mads Schenstrøm Stefansen, Copenhagen (DK)

(73) Assignee: Nokia Corporation, Espoo (FI)

( * ) Notice: Subject to any disclaimer, the term of this patent is extended or adjusted under 35 U.S.C. 154(b) by 271 days.

(21) Appl. No.: 10/829,415

(22) Filed: Apr. 21, 2004

(65) Prior Publication Data
US 2005/0239520 A1 Oct. 27, 2005

(51) Int. Cl.
*H04M 1/00* (2006.01)
(52) U.S. Cl. .............. 455/575.3; 455/575.1; 455/90.3; 361/683; 361/759; 16/368
(58) Field of Classification Search ............. 455/575.3, 455/575.1, 90.3; 361/673, 759; 16/368, 16/354
See application file for complete search history.

(56) References Cited

U.S. PATENT DOCUMENTS

| 4,825,395 | A | * | 4/1989 | Kinser et al. ............... 361/680 |
| 5,666,694 | A | * | 9/1997 | Slow et al. .................... 16/368 |
| 5,987,704 | A | * | 11/1999 | Tang ............................. 16/354 |
| 6,259,897 | B1 | * | 7/2001 | Kim ........................ 455/575.7 |
| 6,304,431 | B1 | * | 10/2001 | Kim ........................... 361/680 |
| 2002/0154475 | A1 | | 10/2002 | Lammintaus et al. ....... 361/683 |
| 2003/0172495 | A1 | | 9/2003 | Pan ............................. 16/292 |

FOREIGN PATENT DOCUMENTS

JP  2003-309756  10/2003

* cited by examiner

*Primary Examiner*—N H Cong Le
(74) *Attorney, Agent, or Firm*—Perman & Green, LLP

(57) ABSTRACT

A mobile communications terminal including a first section having a keypad; a second section having a display; and a connection movably connecting the second section with the first section. The connection includes a first axis of rotation with the first section, an offset second axis of rotation with the second section, and synchronizing members which transfer rotational movement of the first section relative to the connection to rotational movement of the second section relative to the connection.

11 Claims, 8 Drawing Sheets

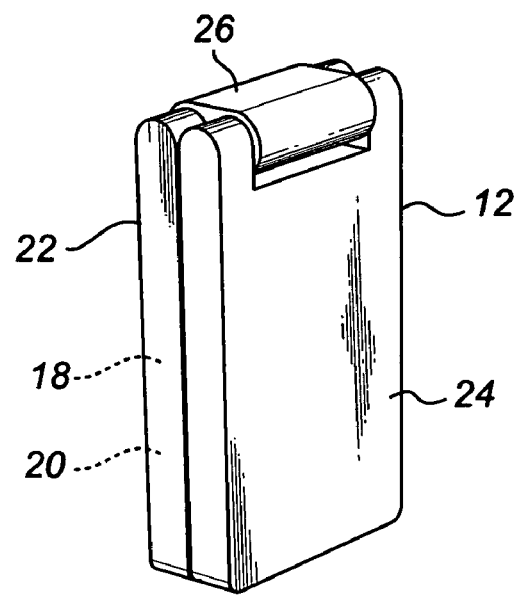
Fig. 1
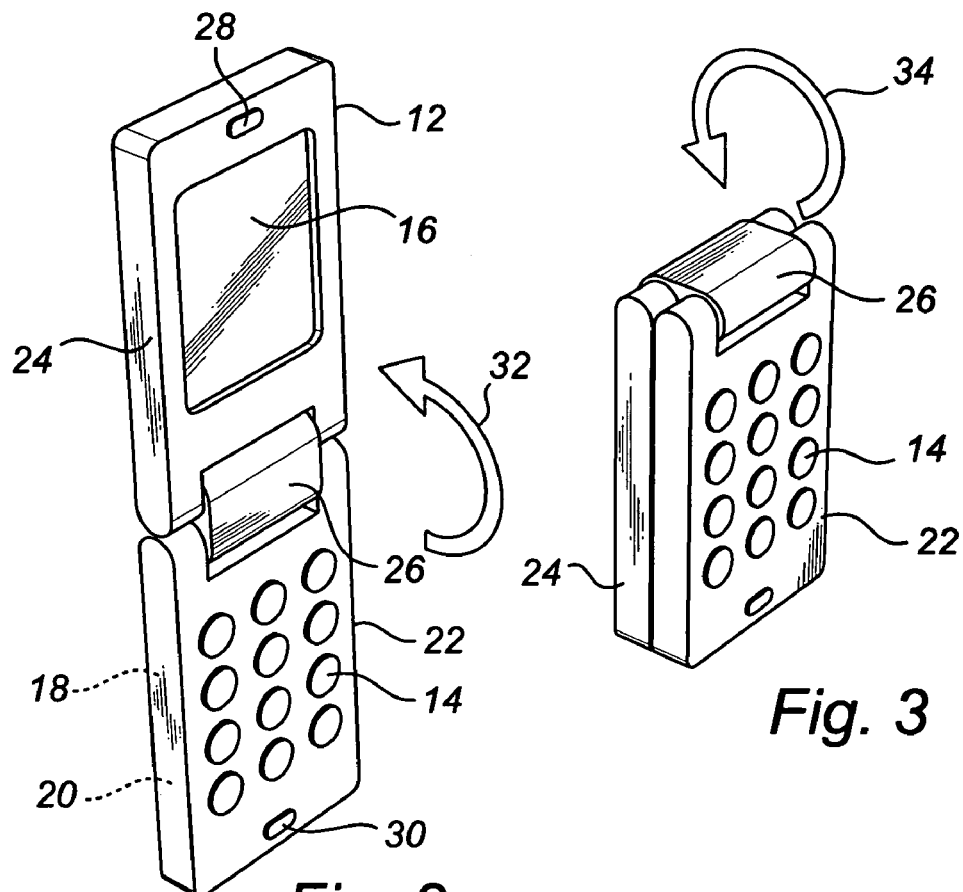
Fig. 2
Fig. 3

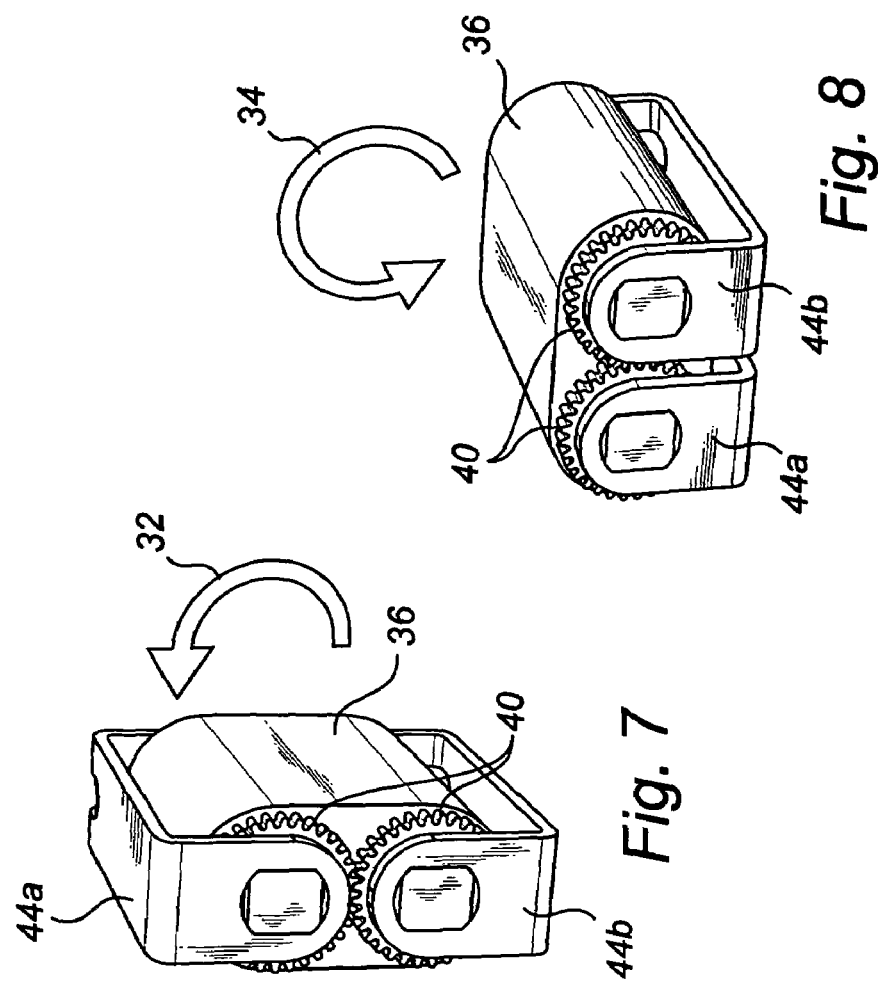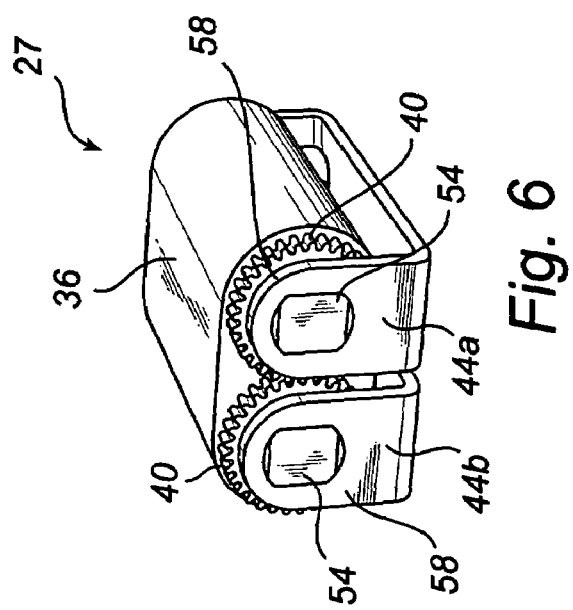

HINGE FOR FOLD PHONE

CROSS-REFERENCE TO RELATED APPLICATIONS

This application claims the benefit of U.S. application Ser. No. 10/421,278, filed Apr. 23, 2003.

FIELD OF THE INVENTION

The present invention relates to mobile mobile communications terminals and, more particularly, to a folding mobile communications terminal.

BACKGROUND

U.S. patent Publication No. US 2002/0154475 A1 discloses a folding electronic device. The device has a first part with a keyboard and a second part with a display. The second part is connected to the first part by a two-joint mechanical hinge. The second part can be moved between a first position against a first side of the first part and a second position against an opposite second side of the first part.

Fold mobile phones, also known as a flip phone or a clamshell phone, are becoming more and more popular in today's mobile telephone market, especially in Asia. In normal fold mobile phones, the phones have a lid with a display which pivots about 160–180 degrees relative to the portion of the telephone having the keypad. The fold phone has two positions of the lid; either a closed position or an open position.

There is a desire for a new type of reconfigurable mobile telephone which can be configured similar to a conventional flip phone, and which also can be reconfigured with the lid pivoted more than 180 degrees, such as 360 degrees. However, for such a multi-open position fold mobile telephone, there is a desire to provide a robust and compact design which can provide a smooth opening and closing motion for the user. This type of motion will prevent the user from erroneously perceiving the mobile telephone as having a flimsy construction (which might be perceived from a flip phone which opens and closes too easily or with a hinge that does not move in a consistent repetitive fashion).

The Japanese patent document JP2003-309756 discloses a foldable mobile telephone, wherein a display portion is pivotable 180 degrees around a first axis relative a keyboard portion. The display portion is moreover pivotable 90 degrees around a second axis perpendicular to the first axis. A user of the mobile telephone may hence more freely turn the display portion to a desired direction. However, the structure of the hinge according to JP 2003-309756 does not allow a 360 degree folding of the two portions forming the mobile telephone.

US 2003/0172495 A1 discloses a flip phone having a hinge mechanism with an auto-lock function. The flip phone includes a main body and a flipper connected by means of the hinge. The hinge is arranged to rotatably connect the flipper to the main body so as to provide an opened position or a closed position for the flipper. In the open position, the flipper is positioned at an angle approximately 160 degrees relative the main body.

SUMMARY OF THE INVENTION

In accordance with one aspect of the invention a hinge for a mobile communications terminal comprising a first and a second section is provided. The hinge comprises a first hinge member defining a first axis of rotation with the first section, a second hinge member defining an offset second axis of rotation with the second section, and synchronizing members which transfer rotational movement of the first section relative to the hinge to rotational movement of the second section relative to the hinge. Due to the synchronized movements of the first and second sections, the two sections will fold and unfold smoothly without the risk of jamming the hinge, i.e. the case where one section unfolds in relation to the hinge while the second section remains immovable relative to the hinge.

The hinge may comprise a hinge frame having a general oval side profile and two parallel pin receiving holes. The thickness of the hinge may hence be reduced providing a slender but still durable hinge.

The hinge frame may comprise a recess for receiving the synchronizing members. The synchronizing members will then be protected from dust which could imperil the function of the hinge.

The synchronizing members of the hinge may comprise four conical or truncated conical gears connected to each other. More specifically the hinge may comprise a first and second hinge pin rotatably mounted in the pin receiving holes, wherein each of the first and second hinge pins may have one conical or truncated conical gear connected thereto, and each of the first or second hinge pins may be rigidly connected to a respective one of the first and second sections. A third, transverse hinge pin may have two conical or truncated conical gears connected thereto and may be rotatably mounted in connection to the conical or truncated conical gears of the first and second hinge pins so that rotational movement of the first hinge pin is transferred to the second hinge pin via the conical or truncated conical gears. The hinge hence provides a compact arrangement for transferring rotational movement from a first axis of rotation to a second axis of rotation.

The hinge may comprise a hinge lock for locking the position of the second section relative to the first section at an intermediate position between a fully closed position and a 360 degree fully open position. A user of a device equipped with a hinge according to the present invention may hence unfold the device to specific, predetermined positions for e.g. viewing a screen on the device.

The hinge may comprise a hinge lock which comprises planar cut-outs on a partially cylindrical surface arranged between the two conical or truncated conical gears on the third hinge pin, wherein the partial cylindrical surface is arranged in contact with a spring-loaded lock control part. A very compact but still robust and flexible locking system is provided by the invention.

In accordance with another aspect of the present invention, a mobile communications terminal is provided including a first section having a keypad; a second section having a display; and a connection movably connecting the second section with the first section. The connection includes a first axis of rotation with the first section, an offset second axis of rotation with the second section, and synchronizing members which transfer rotational movement of the first section relative to the connection to rotational movement of the second section relative to the connection.

In accordance with another aspect of the present invention, a mobile communications device is provided comprising a housing; a transceiver in the housing; a keypad connected to the housing; and a display connected to the housing. The housing comprises a first section movably connected to a second section of the housing by a multi-axis hinge. A first axis of rotation of the hinge is provided at the first section of the housing. A second offset axis of rotation of the hinge is provided at the second section of the housing. The hinge comprises means for synchronizing rotation of the first and second sections relative to the hinge through a path of about 360 degrees.

In accordance with another aspect of the present invention, a mobile communications device is provided comprising a housing having a first section, a second section, and a synchronized rotation multi-axis hinge connection connecting the first section with the second section; a transceiver located in the housing; a keypad connected to the housing; a display connected to the housing; and a flex conductor extending across the hinge connection and coupling electronic circuitry in the first section of the housing with electronic circuitry in the second section of the housing. The synchronized rotation multi-axis hinge connection comprises a hinge frame; two hinge pins rotatably mounted in the hinge frame; synchronizing gears connecting the hinge pins to each other; a first frame member fixedly connecting a first one of the hinge pins to the first section of the housing; and a second frame member fixedly connecting a second one of the hinge pins to the second section of the housing. The second section of the housing is adapted to rotate about 360 degrees relative to the first section of the housing.

BRIEF DESCRIPTION OF THE DRAWINGS

The foregoing aspects and other features of the present invention are explained in the following description, taken in connection with the accompanying drawings, wherein:.

FIG. 1 is a perspective view of a mobile communications terminal in a first closed position incorporating features of the present invention;

FIG. 2 is a perspective view of the mobile communications terminal shown in FIG. 1 with housing components moved to an intermediate flipped open position;

FIG. 3 is a perspective view of the mobile communications terminal shown in FIG. 1 with housing components moved to a 360 degree fully flipped open and folded position;

FIG. 6 is a perspective view of an alternative embodiment of the hinge used in the mobile communications terminal shown in FIG. 1 with the hinge shown at a first closed position corresponding to the position shown in FIG. 1;

FIG. 7 is a perspective view of an alternative embodiment of the hinge shown in FIG. 6 moved to a second intermediate position corresponding to the position shown in FIG. 2;

FIG. 8 is a perspective view of an alternative embodiment of the hinge shown in FIG. 6 moved to a third position corresponding to the position shown in FIG. 3;

DETAILED DESCRIPTION OF EMBODIMENTS

Figure 4A:
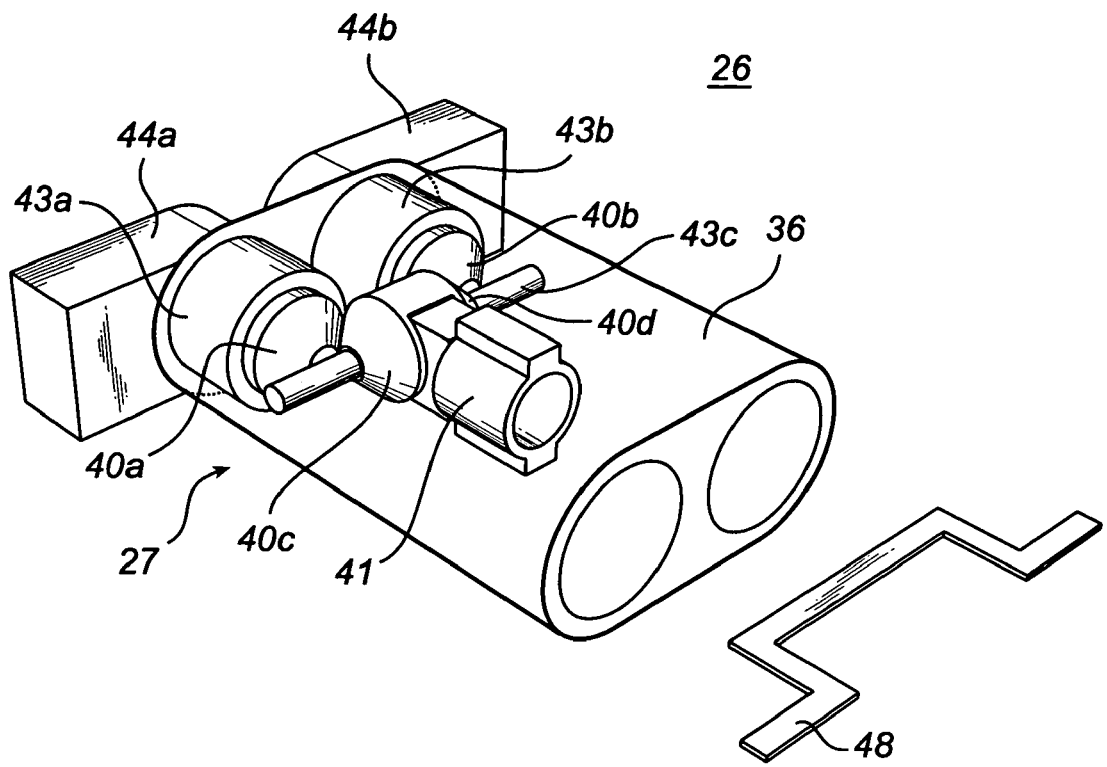
FIG. 4a is an perspective view of a hinge for the mobile communications terminal shown in FIG. 1 according to a preferred embodiment of the present invention.

Referring to FIG. 1, there is shown a perspective view of a mobile communications terminal 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

In the embodiment shown, the mobile communications terminal 10 generally comprises a mobile communicator, such as a mobile telephone. In alternate embodiments, the mobile communications terminal could comprise any suitable type of mobile communicator, such as a device which comprises a pager function or a text transmission function. The mobile communications terminal 10 could comprise any suitable type of features including, for example, a digital camera feature.

Referring also to FIG. 2, the mobile communications terminal 10, in the embodiment shown, generally comprises a housing 12, a keypad 14, a display 16, a transceiver 18, a battery 20 and other components conventional to a mobile telephone, such as a microprocessor and an antenna. The housing 12 generally comprises a first section 22, a second section 24, and a connection 26 which movably connects the second section 24 to the first section 22. In the embodiment shown, the keypad 14 is connected to the first section 22 of the housing. The display 16 is connected to the second section 24 of the housing. In alternate embodiments, the various electronic components of the telephone 10 could be located in any one of the housing sections.

Referring particularly to FIGS. 1–3, the housing 12 is movable into at least three different configurations. FIG. 1 shows the housing 12 in a closed, folded first configuration. In this closed, folded first configuration the first and second sections 22, 24 are located adjacent each other with the display 16 and keypad 14 facing each other. This provides a compact folded configuration wherein the keypad 14 and display 16 are not readily accessible to the user. In an alternate embodiment, the first section 22 could comprise the display 16.

FIG. 2 shows the housing 12 in the first open position. More specifically, the connection 26 allows the second section 24 of the housing to be flipped open about 180 degrees relative to the first section 22 of the housing as indicated by arrow 32. In the embodiment shown, the second section 24 is substantially aligned with the first section 22 and the connection 26. However, in alternate embodiments, the first open position could comprise the second section 24 being located at an angle of less than 180 degrees, such as about 160 degrees for example. This first open position allows the user to locate a speaker or sound transducer 28 at the user's ear and a microphone 30 proximate the user's mouth.

FIG. 3 shows the housing 12 in a second open position. More specifically, the connection 26 allows the second section 24 of the housing to be folded over about another 180 degrees relative to the first section 22 of the housing as indicated by arrow 34. In this fully open 360 degree flipped position, the first and second sections 22, 24 are collapsed against each other in the open folded position shown, but in a reverse orientation relative to the closed, folded position shown in FIG. 1. In this second open position, the keypad 14 is located at the exterior facing side of the first section 22 and the display 16 is located at the opposite exterior facing side of the second section 24. In the folded fully open position shown in FIG. 3 a user can use the mobile communications terminal 10 in a collapsed, folded configuration, for example such as when the mobile communications terminal comprises a digital camera feature, or a game feature which could comprise use of keys on the second section 24, or when the display 16 comprises a touch screen display.

Referring to FIG. 4*a*, an outlined perspective view of a first embodiment of the connection 26 of the mobile communications terminal 10 is shown. The connection 26 generally comprises a synchronized rotation, multi-axis hinge 27 and an electrical flex conductor 48. The hinge 27 generally comprises a hinge frame 36, synchronizing gears 40*a–d*, and locking means 41 for allowing the housing 12 to be locked in different fixed positions as mentioned above.

Naturally, the flex conductor could be replaced with an assembly of coaxial or micro coaxial cables.

Figure 4B:
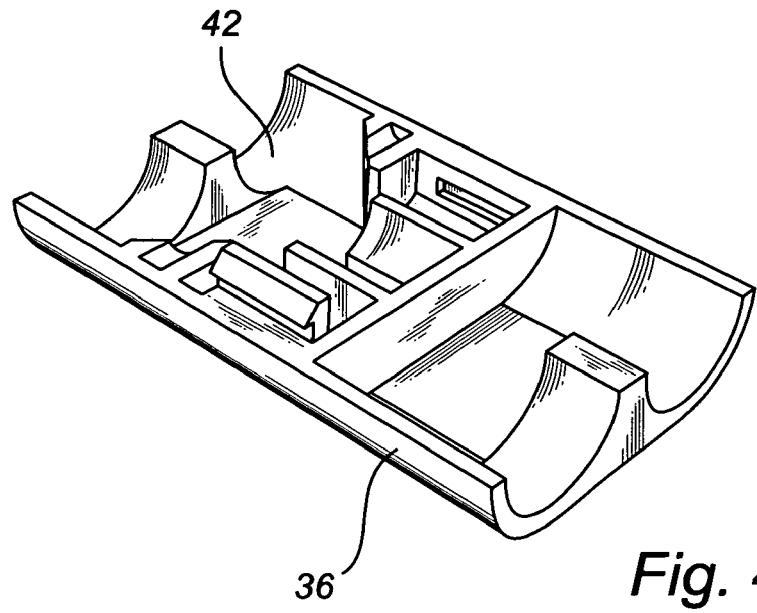
FIG. 4b is an exploded perspective view of a portion of the hinge.
Figure 4C:
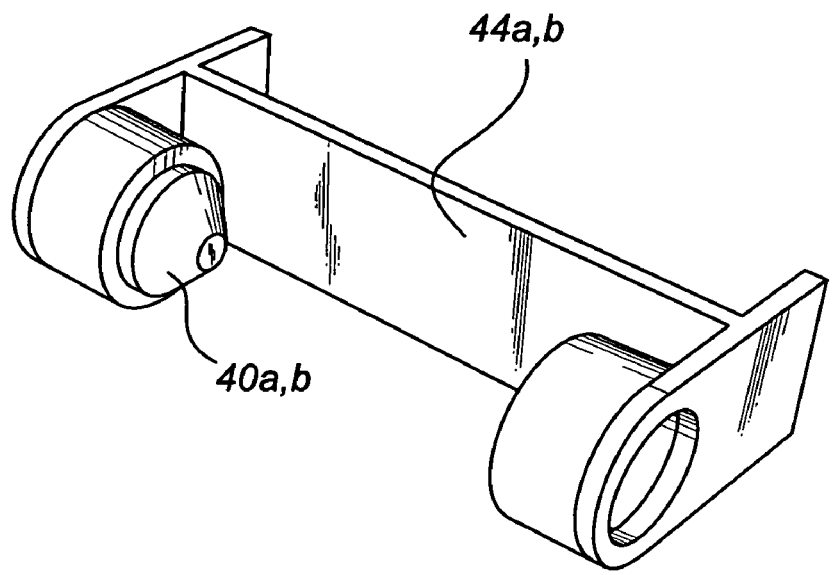
FIG. 4c is a perspective view of a frame member adapted to be connected to the hinge.

The hinge frame 36 has a generally oval side profile. The hinge frame 36 has a recess 42, shown in the exploded view in FIG. 4*b*, for receiving two hinge members in form of hinge pins 43*a*, 43*b* with synchronizing gears 40*a*, 40*b* attached thereto, and a third hinge pin 43*c* with two synchronizing gears 40*c*, 40*d* attached thereto. The gears 40*a–d* have a conical or truncated conical shape and are interlockingly connected to each other by their teeth and grooves (not shown for the sake of clarity) in a manner known per se. The two hinge pins 43*a*, 43*b* are attached to a first and second frame member 44*a*, 44*b*, shown in more detail in FIG. 4*c*. The frame members 44*a*, 44*b* are preferably arranged to cover the entrance to the recess 42, wherein the frame members 44*a*, 44*b* will prevent dust from entering the recess, which otherwise could imperil the function of the hinge 27 by interfering with the interlocking engagement of the teeth and grooves of the gears 40*a–d*. The first frame member 44*a* is fixedly attached to the first section 22 of the housing. The second frame member 44*b* is fixedly attached to the second section 24 of the housing.

With the gears 40*a*, 40*b* mounted on the hinge pins 43*a*, 43*b*, the gears 40*a*, 40*b* are fixedly attached to the frame members 44*a*, 44*b* for synchronized rotation of the frame members 44*a*, 44*b* relative to each other. It is appreciated in this context that the hinge pins 43*a*, 43*b* may be attached directly to the first and second sections 22, 24 of the housing, wherein the frame members 44*a*, 44*b* may be omitted.

The gears 40*a–d* hence form synchronization members to assist in synchronizing movement of the first and second sections 22, 24 relative to each other.

Because the hinge frame 36 comprises a general oval shaped side profile, the hinge frame 36 is able to span the gap between the connection areas with the frame members 42, 44 when the first and second sections 22, 24 are configured in their folded, thicker configuration shown in FIGS. 1 and 3. However, the hinge frame 36 is able to vertically align with the first and second sections 22, 24 when they are reconfigured into the smaller thickness intermediate flipped open position shown in FIG. 2. This provides the mobile communications terminal with a slimmer thickness profile at the hinge 27 when the device is arranged in an intermediate flipped open position. This helps to match the thickness of the repositioned hinge frame with the thicknesses of the housing sections 22, 24; or at least prevents the hinge from significantly stand out. This provides for a better appearance of the device when flipped open to the intermediate flipped open position. Alternatively, the hinge frame 36 can provide a relatively innocuous hinge transition between the first and second sections 22, 24 if the intermediate flipped open position is less than 180 degrees.

Figure 4D:
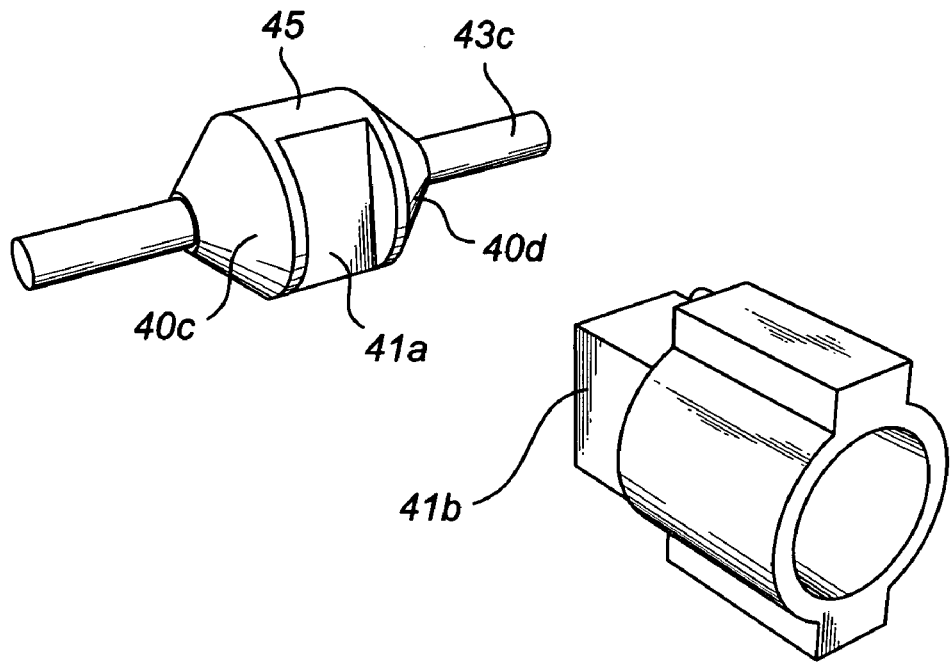
FIG. 4d is perspective view of a lock used in the hinge for locking the hinge at predetermined angles.

FIG. 4*d* is a perspective exploded view of the locking means 41 according to a preferred embodiment of the present invention. As can be seen from the figure the locking means 41 is preferably formed by one or more planar cut-outs 41*a* on an otherwise cylindrical thickened portion 45 of the hinge pin 43*c*, and a spring loaded control part 41*b* which is pressed against the thickened portion 45. The friction between the thickened portion 45 and the control part 41*b* provides a controlled torsional resistance in the hinge 27, wherein the folding and unfolding of the mobile communications terminal 10 will be perceived by a user as firm and not flimsy (which might be perceived from e.g. a flip phone which opens and closes too easily). In order to achieve the desired torsional resistance between the thickened portion 45 and the control part 41*b*, the material used for the contact surface of the control part 41*b* may be rubber, plastic, or any other suitable polymer material, or natural material such as cork. The thickened portion 45 may be integral with the hinge pin 43*c* or arranged on the surface thereof, and may be made of plastic or any other suitable material such as rubber or metal.

When the control part 41*b*, during rotation of the thickened portion 45, engages one of the planar cut-outs 41*a*, the spring-loaded control part 41*b* will protrude into the recess formed by the planar cut-out 41*a* in the otherwise cylindrical surface. The force needed to push the control part 41*b* out of the planar cut-out 41*a* when the thickened portion is rotated is greater than the force needed to overcome the friction between the control part 41*b* and the surface of the thickened portion 45. Hence a distinct locking of the first and second section 22, 23 at predetermined angles relative each other is achieved by providing one or more planar cut-outs at predetermined locations on the periphery of the thickened portion 45.

Figure 4E:
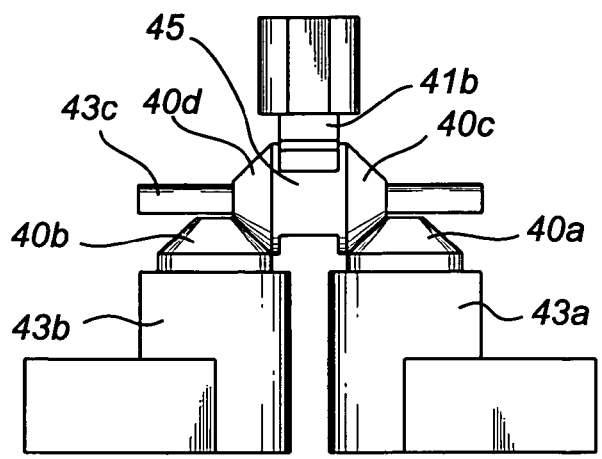
FIG. 4e is a view of a conical gear system used for transferring rotational movement from a fist axis to a second axis.
Figure 4F:
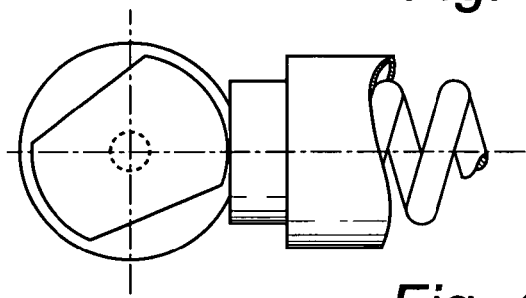
FIG. 4f is a side view of the lock in a friction controlled position.
Figure 4G:
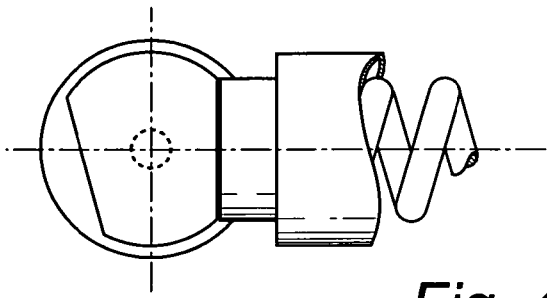
FIG. 4g is a side view of the lock in a locked predetermined position.
Figure 4H:
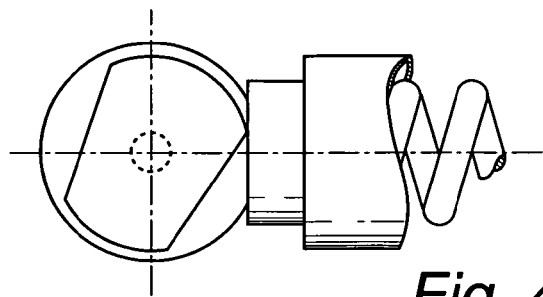
FIG. 4h is a side view of the lock in a flip-over position.

FIGS. 4*f–4j* is a more detailed illustration of the function of the locking means 41. In FIG. 4*e* the locking means 41 is in a friction controlled position, wherein the control part 41*b* engages the thickened portion 45 and provides a controlled frictional resistance of the hinge 27. FIG. 4*g* illustrates the lock in a locked position, wherein the control part 41*b* engages the planar cut-out in the thickened portion 45. FIG. 4*h* illustrates the lock in a position between the locked position and the friction controlled position.

Figure 4I:
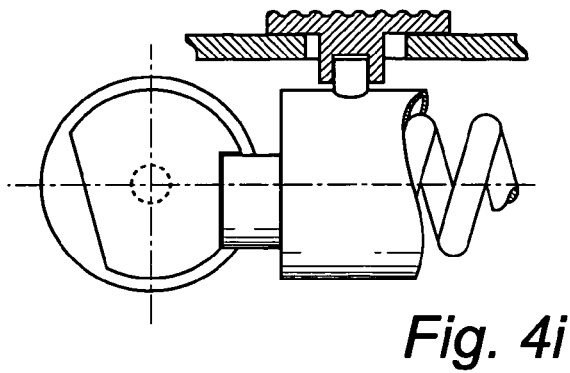
FIG. 4i is a side view of the lock in a locked predetermined position, wherein the lock comprises a release key for enabling further rotation beyond the locked position.
Figure 4J:
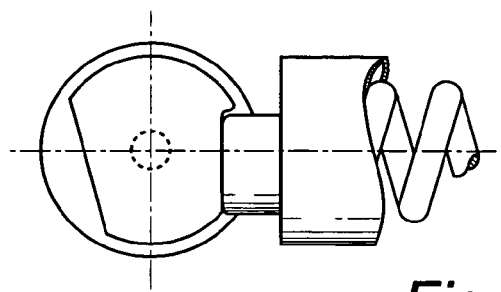
FIG. 4j is a side view of the lock in a locked position with a physical stop for providing increased torque when rotating past the locked position.

FIG. 4i illustrates yet an embodiment of the lock, wherein a release key is added to the construction in order to provide a firm stop at a predetermined angle, e.g. 165 degrees, and at the same time enabling a user of the mobile communications terminal 10 to continue the rotation of the two sections 22, 24 beyond the lock position. In order to do so the user of the mobile communications terminal 10 pushes the release key to the right in the figure for withdrawing the control part 41b from the planar cut-out 41a. A further rotation is then possible. FIG. 4j illustrates yet another embodiment for providing a firm stop at a predetermined angle. A shoulder formed at the junction between the planar cut-out 41a and the cylindrical portion of the thickened portion 45 provides an increased torque when a user tries to rotate the first 22 and second 24 sections beyond the locking position. No release key is hence needed in this embodiment.

FIG. 4e is a more detailed view of the hinge according to the present invention. The hinge pin 43a is connected to the frame member 44a or directly to the first section 22 of the mobile communications terminal 10. The conical gear 40a, arranged on the first hinge pin 43a, engages the conical gear 40c which is arranged on the third hinge pin 43c. If the first section 22 is rotated, the rotational movement will consequently be transferred from the first hinge pin 43a to the third hinge pin 43c by means of the mechanical coupling between the gears 40a and 40c. The conical gear 40d, which also is arranged on the third hinge pin 43c, will rotate together with the conical gear 40c. The conical gear 40d engages the conical gear 40b which is arranged on the second hinge pin 40b and hence transfers any rotational movement from the third hinge pin 43c to the second hinge pin 43b. The rotational movement initiated by the turning of the first hinge pin 43a is hence transferred to the second hinge pin 43b via the third hinge pin 43c.

The first section 22 of the mobile communications terminal 10 is by the arrangement disclosed above adapted to rotate relative to the hinge substantially in unison with rotation of the second section 24 relative to the hinge 27. In a preferred embodiment the gears 40a–d are of the same size, wherein the two sections 22, 24 are rotated by the same amount relative to the hinge 27. It is, however, equally possible to provide gears 40a–d of different sizes, wherein the first and second sections 22, 24 will rotate an unequal amount relative to the hinge 27.

Figure 5:
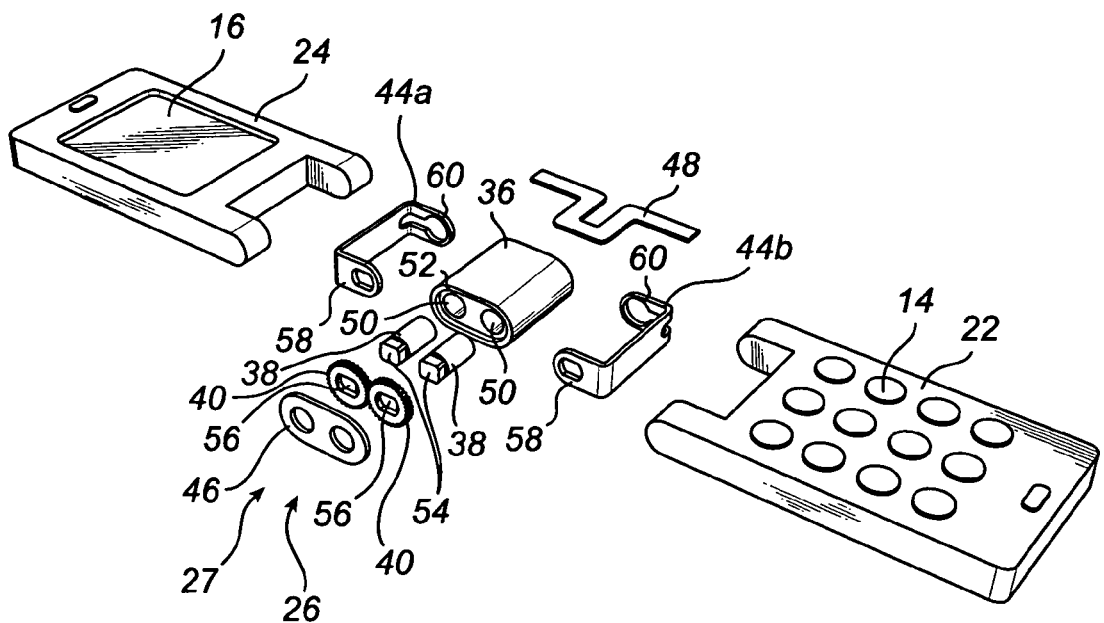
FIG. 5 is an exploded perspective view of an alternative embodiment of the mobile communications terminal shown in FIG. 1.

Referring to FIG. 5, an exploded perspective view of an alternative embodiment of the mobile communications terminal 10 is shown. The connection 26 generally comprises a synchronized rotation, multi-axis hinge 27 and an electrical flex conductor 48. The hinge 27 generally comprises a hinge frame 36, two hinge modules or pins 38, synchronizing gears 40, two frame members 44a, 44b, and a dust cover 46. The hinge frame 36 has a general oval side profile. The hinge frame 36 comprises two parallel pin receiving areas 50. The hinge frame 36 also comprises a recess 52 at the entrance to the pin receiving areas 50.

The hinge modules 38 are rotatably located in the receiving areas 50. Front portions 54 have a keyed shape to be received in key shaped apertures 56 of the gears 40. The gears 40 are interlockingly connected to each other by their teeth and grooves. With the gears 40 mounted on the front portions 54 of the hinge modules 38, the gears 40 are fixedly attached to the hinge modules 38 for synchronized rotation of the hinge modules 38 relative to each other. The gears 40 are located in the recess 52 of the hinge frame 36. The gears 40 form synchronization members to assist in synchronizing movement of the hinge frame 36 relative to movement of the first and second sections 22, 24 relative to each other. The hinge modules could be commercially available products. The hinge modules could comprise an internal detent system.

The front portions 54 of the hinge modules 38 are also connected to ends 58 the frame members 44a, 44b. Specifically, a first one of the hinge modules 38 is fixedly and stationarily connected to the front portion 54 of the first frame member 44a and, a second one of the hinge modules 38 is fixedly and stationarily connected to the front portion 54 of the second frame member 44b. The dust cover 46 is preferably located between the gears 40 and the frame members 42, 44. The dust cover 46 helps to prevent dust or debris from entering into the receiving areas 50 of the hinge frame 36 and interfered with the interlocking engagement of the teeth and grooves of the gears 40. In the embodiment shown, opposite ends 60 of the frame members 42, 44 are pivotably connected to pivot sections 66 (see FIGS. 11 and 12) extending from the hinge frame 36.

The first frame member 44a is fixedly and stationarily attached to the first section 22 of the housing. The second frame member 44b is fixedly and stationarily attached to the second section 24 of the housing.

FIG. 6 shows the hinge 27 at a first position corresponding to the closed position of the mobile communications terminal shown in FIG. 1. The dust cover 46 is not shown in FIGS. 6–8 for the sake of clarity. The discussion below will be made with reference to the embodiment of the present invention shown in FIG. 5, but it is appreciated that the same reasoning is applicable to the embodiment shown in FIG. 4a. As can be seen, the second frame member 44b is located adjacent the front side of the first frame member 44a.

When the second section 24 of the housing is moved from the closed position shown in FIG. 1 to the intermediate flipped open position shown in FIG. 2 the two frame members 44a, 44b are repositioned relative to each other as shown in FIG. 7. Because the hinge modules 38 are stationarily connected to respective ones of the frame members 44a, 44b and the gears 40 are stationarily connected to the hinge modules 38, the hinge frame 36 rotates about 90 degrees from the position shown in FIG. 6 to the positions shown in FIG. 7. The hinge modules 38 also rotating about 90 degrees relative to each other, but the two frame members 44a, 44b rotate about 180 degrees relative to each other.

Because the hinge frame 36 comprises a general oval shaped side profile, the hinge frame 36 is able to span the gap between the connection areas with the frame members 44a, 44b when the first and second sections 22, 24 are configured in their folded, thicker configuration shown in FIGS. 1 and 3. However, the hinge frame 36 is able to vertical align with the first and second sections 22, 24 when they are reconfigured into the smaller thickness intermediate flipped open position shown in FIG. 2. This provides the mobile communications terminal with a slimmer thickness-profile at the hinge 27 when the device in at the intermediate flipped open position. This helps to match the thickness of the repositioned hinge frame with the thicknesses of the housing sections 22, 24; or at least not significantly stand out. This provides for a better appearance of the device when flipped open to the intermediate flipped open position. Alternatively, the hinge frame 36 can provide a relatively innocuous hinge transition between the first and second sections 22, 24 if the intermediate flipped open position is less than 180 degrees.

When the second section 24 of the housing is moved from the intermediate flipped open position shown in FIG. 2 to the 360 degree fully flipped open and folded position shown in FIG. 3, the two frame members 44a, 44b are reposition relative to each other as shown in FIG. 8. The second frame member 44b is located against the rear side of the first frame member 44a. Because the hinge modules 38 are stationarily connected to respective ones of the frame members 44a, 44b and the gears 40 are stationarily connected to the hinge modules 38, the hinge frame 36 rotates another 90 degrees from the position shown in FIG. 7 to the position shown in FIG. 8. The hinge modules 38 also rotating another 90 degrees relative to each other, but the two frame members 44a, 44b rotate about 180 degrees relative to each other. The two frame members 44a, 44b are rotated about 360 degrees from the position shown in FIG. 6 to the position shown in FIG. 8. Thus, the mobile communications terminal 10 can be reconfigured from the folded closed position shown in FIG. 1 to the 360 degree fully flipped open and folded position shown in FIG. 3.

Referring back to FIG. 4a or 5, as noted above the connection 26 comprises a flex conductor 48, such as a flexible printed circuit. The flex conductor 48 connects electronic circuitry in the first section 22 with electronic circuitry in the second section 24. The flex conductor 48 extends across the hinge connection. In one embodiment, the hinge frame 36 could comprise a receiving area for receiving a portion of the flex conductor 48. In an alternate embodiment, the flex conductor 48 could be mounted on an exterior side of the hinge frame 36.

The present invention provides for a totally new concept for a different type of a flip phone. A mobile telephone incorporating features of the present invention can comprise a 360 degree turn of one housing section relative to another housing section. The present invention can provide a 360 degree hinge and, more specifically, a new synchronizing mechanism which can be integrated into the hinge of the foldable device. One housing section of the device can be turned 360 degrees around another housing section of the device smoothly and synchronized with movement of the hinge frame.

The hinge synchronization mechanism can consist of a hinge frame, two or four synchronizing gears, two hinge modules or pins, and a dust shield. When turning the hinge from a closed start position, the synchronizing gears are connected to each other and both hinge axes are rotating similar angles. Both axes are rotated equally about 180 degrees. The present invention provides a controlled and synchronized 360 degree hinged movement. With the present invention, the usability of the product is approved. The present invention provides a robust and compact construction, and dust and particles are prevented entry to the mechanism.

Figure 9:
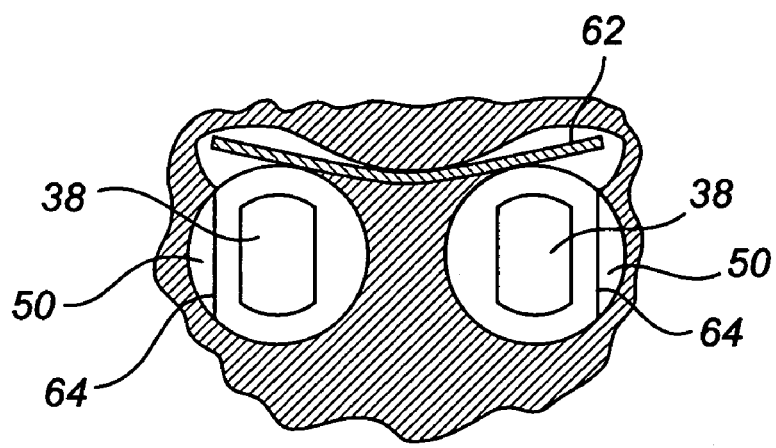
FIG. 9 is a partial cross sectional view of a lock system of an alternate embodiment of the hinge with the lock system shown in a position corresponding to the positions shown in FIG. 1 and 6.
Figure 10:
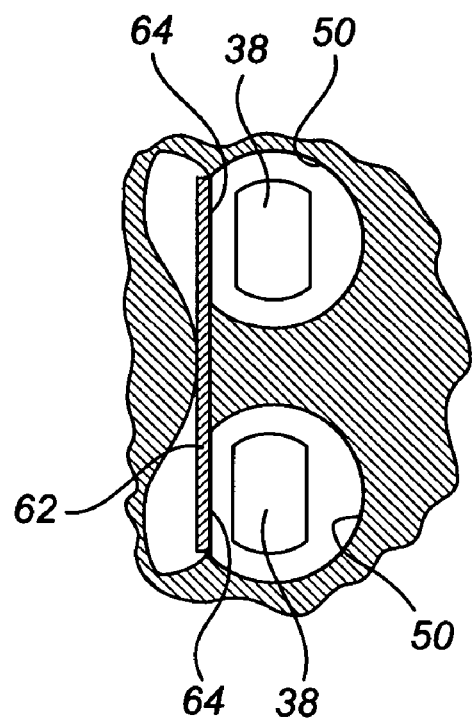
FIG. 10 is a partial cross sectional view of the lock system as in FIG. 9 shown in a position corresponding to the positions shown in FIGS. 2 and 7.

In order to maintain relative position of the first and second sections 22, 24 relative to each other, the hinge 27 could comprise sufficient frictional resistance to movement as is known in the art, such as a friction pack. Referring also to FIGS. 9 and 10, an alternate embodiment of a system for detent locating of the first and second sections relative to each other is shown. In this embodiment, the hinge comprises a leaf spring 62. The hinge modules 38 include exterior flat surfaces 64. FIG. 9 shows the interaction between the spring 62 and the exterior surfaces of the hinge on modules 38. In this position, the detent spring 62 is deflected by contact with the exterior surfaces of the hinge modules 38.

The position shown in FIG. 9 corresponds to the configuration of the mobile communications terminal as shown in FIG. 1. The flat surfaces 64 are spaced from the spring 62. When the mobile communications terminal is reconfigured to the position shown in FIG. 2, as shown in FIG. 10 the flat surfaces 64 comes into registration with the detent spring 62. The detent spring 62 returns to an undeflected position to form a biasing detent to hold the first and second sections 22, 24 at the intermediate flipped open position shown in FIG. 2. In alternate embodiment, any suitable type of detent configuration positioning system could be provided. For example, in one type of alternate embodiment, the hinge modules 38 could comprise an internal detent system, such as when the hinge modules each comprise more than a single member.

Figure 11:
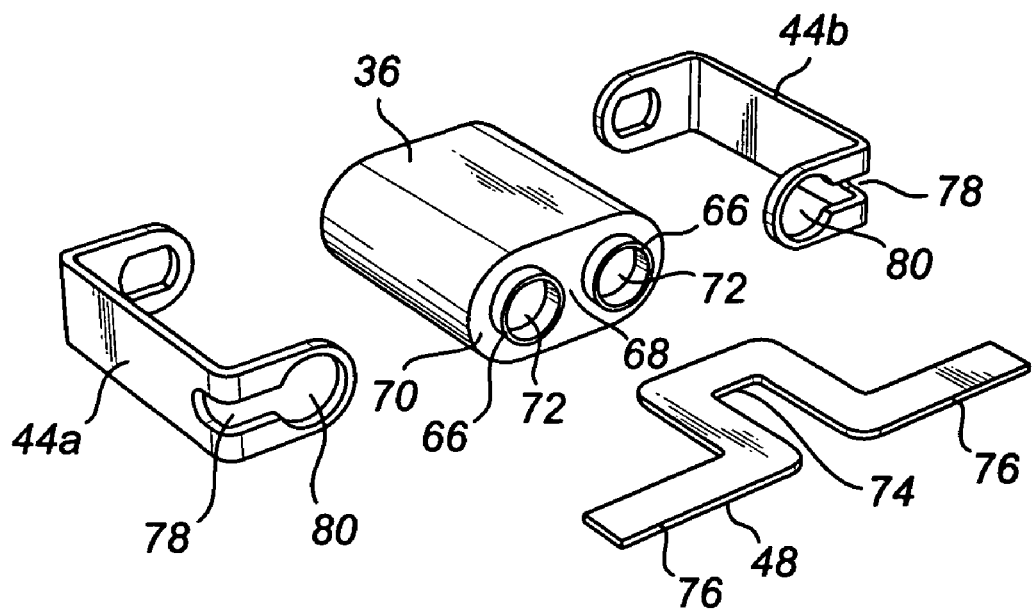
FIG. 11 is an exploded view of the hinge as shown in FIG. 6 from an opposite side.
Figure 12:
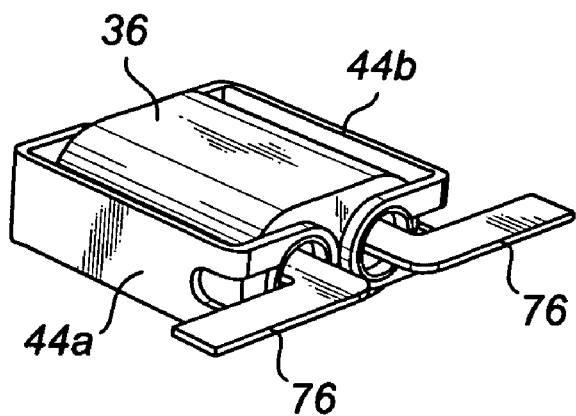
FIG. 12 is an assembled view of the hinge as shown in FIG. 11.

Referring now to FIGS. 11 and 12, a view of the hinge 27 of FIGS. 4–8 is shown from the opposite side. In this embodiment the flex conductor 48 is mounted to the interior side of the hinge frame. The hinge frame 36 has the two pivot sections 66 extending from the opposite side 70. Each pivot section 66 has a center channel 72. The hinge frame 36 includes a slot 68 into the side 70. The slot extends through the pivot sections 66 and connects the two center channels 72 to each other. The flex conductor 48 has a center portion 74 and two end portions 76. The center portion is inserted into the slot 68 and extends out of the two center channels 72. The end portions 76 extend in opposite directions once exiting the center channels 72. The two end portions 76 of the flex conductor are attached to circuitry in the first and second sections 22, 24. The flex conductor 48 is bendable as the first and second sections 22, 24 move relative to each other. The relatively long length of the flex conductor 48 helps to prevent metal fatigue of the conductors and failure of the flexible insulating substrate in the flex conductor 48.

The flex conductor 48 is inserted into the slot 68 before the frame members 42, 44 are attached to the pivot sections 66. In the embodiment shown, the frame members 44a, 44b have slots 78 from the mounting apertures 80 which help to mount the frame members 44a, 44b over the flex conductor 48 as shown in FIG. 11. Once assembled, the frame members 44a, 44b block exit of the center portion 74 from the center of the slot 68 to thereby keep the assembly together. However, in alternate embodiments, any suitable type of assembly retainment system could be provided.

Frame members 44a, 44b are very useful when assembling and for robust construction. However, in an alternate embodiment the frame members 44a, 44b might not be provided. As mentioned above, it is possible to mount the hinge frame and synchronizing mechanism directly to the housing sections 22, 24. Similar to a current type of mobile camera-phone, the present invention could comprise a camera at the junction between the two moving housing sections. More specifically, the present invention can be adapted to provide a camera in the hinge frame 36. A power plug and/or other external connector can alternatively or additionally be integrated into the hinge frame 36. In alternate embodiments, electrical connection through the hinge between the folds to the housing sections 22, 24 can be provided by any suitable electrical connection, such as done by a metal slide connection or by pin connectors. Both solutions can be based on the metal connection pads being on the two folds and a spring connector which touches the connection pads.

The electric device according to the invention may comprise a first section having a keypad, a second section having a display, and a connection movably connecting the second section with the first section, wherein the connection comprises a first axis of rotation with the first section, an offset second axis of rotation with the second section, and synchronizing members which rotate the first section relative to the connection in unison with rotation of the second section relative to the connection. The mobile communications terminal may comprise a mobile telephone having a transceiver located in one of the first or second sections. The first and second sections may comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the mobile communications terminal.

The connection may comprises a hinge frame having a general oval side profile and two parallel pin receiving holes and the hinge frame may comprise a recess for receiving the synchronizing members. The synchronizing members comprises two gears connected to each other. The connection may comprise two hinge pins rotatably mounted in the pin receiving holes, each hinge pin having one of the gears connected thereto, and each hinge pin being stationarily connected to a respective one of the first and second sections.

The mobile communications terminal may further comprise a flex circuit extending across the connection and electrically connecting electronic circuitry in the first section to electronic circuitry in the second section.

The mobile communications terminal can also comprise a coaxial cable or micro coaxial cables extending across the connection and electrically connecting electronic circuitry in the first section to electronic circuitry in the second section.

The connection may comprise a detent locating system for locking position of the second section relative to the first section at an intermediate position between a fully closed position and a 360 degree fully open position.

According to an embodiment of the invention a mobile communications device may comprise a housing, a transceiver in the housing, a keypad connected to the housing, and a display connected to the housing, wherein the housing may comprise a first section movably connected to a second section of the housing by a multi-axis hinge, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees.

The first and second sections of the mobile communications device may comprise a first position with the keypad and display being closed by the first and second sections, a second position with the second section rotated about 180 degrees relative to the first section such that the first section is substantially inline with the second section and a hinge frame of the hinge, and a third position with the second section rotated about 360 degrees relative to the first section and having the keypad and display located on opposite exterior facing sides of the mobile communications device.

The hinge of the mobile communications device may comprise a hinge frame having a general oval side profile and two parallel pin receiving holes. The means for synchronizing rotation of the first and second sections relative to the hinge in the mobile communications device may comprise gears connected to each other. The hinge of the mobile communications device may comprise two hinge pins rotatably mounted in the pin receiving holes, each hinge pin having one of the gears connected thereto, and each hinge pin being stationarily connected to a respective one of the first and second sections.

The mobile communications device may further comprise a flex circuit extending across the hinge and electrically connecting electronic circuitry in the first section to electronic circuitry in the second section.

The connection in the mobile communications device may comprise a detent locating system for locking position of the second section relative to the first section at an intermediate position between a fully closed position and a 360 degree fully open position.

The mobile communications device may comprise a housing having a first section, a second section, and a synchronized rotation multi-axis hinge connection connecting the first section with the second section; a transceiver located in the housing; a key pad connected to the housing; a display connected to the housing; and a flex conductor extending across the hinge connection and coupling electronic circuitry in the first section of the housing with electronic circuitry in the second section of the housing, wherein the synchronized rotation multi-axis hinge connection may comprise a hinge frame; two hinge pins rotatably mounted in the hinge frame; synchronizing gears connecting the hinge pins to each other; a first frame member fixedly connecting a first one of the hinge pins to the first section of the housing; a second frame member fixedly connecting a second one of the hinge pins to the second section of the housing, and wherein the second section of the housing may be adapted to rotate about 360 degrees relative to the first section of the housing.

The connection of the mobile communications device may comprise a detent locating system for locking position of the second section relative to the first section at an intermediate position at about 180 degrees of rotation between a fully closed position and a 360 degree fully open position.

The first and second sections of the mobile communications device may comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the mobile communications device. The hinge frame of the mobile communications device may have a general oval side profile and two parallel pin receiving holes.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. A hinge for a mobile communications terminal comprising a first and a second section, said hinge comprising:
   a hinge frame;
   a first hinge pin fixed to said first section and mounted for rotation on said hinge frame, said first hinge pin defining a first axis of rotation with the first section;
   a second hinge pin fixed to said second section and mounted for rotation on said hinge frame, said second hinge pin defining a second axis of rotation with the second section, offset from said first axis of rotation, wherein each of the first and second hinge pins is constructed having one conical or truncated conical gear connected thereto; and
   a third hinge pin mounted on said frame for rotation about a third axis of rotation transverse to said first and second axes of rotation, said third hinge pin having two conical or truncated conical gears connected thereto, said conical or truncated conical gears of said third hinge pin being coupled to the conical or truncated conical gears of the first and second hinge pins so that rotational movement of the first hinge pin is synchronized to the second hinge pin via the coupled conical or truncated conical gears of the third hinge pin.

2. A hinge frame as in claim 1, wherein the hinge frame comprises a recess for receiving the synchronizing members.

3. A hinge as in claim 1, wherein the hinge further comprises a hinge lock for locking the position of the second section relative to the first section at an intermediate position between a fully closed position and a 360 degree fully open position.

4. A hinge as in claim 3, wherein the hinge lock comprises planar cut-outs on a partially cylindrical surface arranged between the two conical or truncated conical gears on the third hinge pin, said partial cylindrical surface being arranged in contact with a spring-loaded lock control part.

5. A hinge comprising:
a hinge frame;
a first hinge pin mounted for rotation on said hinge frame, said first hinge pin defining a first axis of rotation, with a first element connected to the hinge;
a second hinge pin mounted for rotation on said hinge frame, said second hinge pin defining a second axis of rotation offset from said first axis of rotation, with a second element connected to the hinge; and
wherein each of the first and second hinge pins are constructed having one conical or truncated conical gear connected thereto;
a third, hinge pin mounted on said frame for rotation about a third axis of rotation transverse to said first and second axes of rotation, said third hinge pin having two conical or truncated conical gears connected thereto, said conical or truncated conical gears of said third hinge pin being coupled to the conical or truncated conical gears of the first and second hinge pins so that rotational movement of the first hinge pin is transferred to the second hinge pin via the coupled conical or truncated conical gears of said third hinge pin to synchronize the relative movement of the first and second elements.

6. A hinge as in claim 5, wherein the hinge comprises a hinge lock for locking position of the second section relative to the first section at an intermediate position between a fully closed position and a 360 degree fully open position.

7. A hinge as in claim 6, wherein the hinge lock comprises planar cut-outs on a partially cylindrical surface arranged between the two conical or truncated conical gears on the third hinge pin, said partial cylindrical surface being arranged in contact with a spring-loaded lock control part.

8. A mobile communications device comprising:
a housing;
a transceiver in the housing;
a keypad connected to the housing; and
a display connected to the housing;
wherein the housing comprises a first section movably connected to a second section of the housing by a multi-axis hinge, wherein the multi-axis hinge further comprises:
a hinge frame:
a first hinge pin mounted for rotation on said hinge frame, said first hinge pin defining a first axis of rotation, with a first element connected to the hinge;
a second hinge pin mounted for rotation on said hinge frame, said second hinge pin defining a second axis of rotation offset from said first axis of rotation, with a second element connected to the hinge, wherein each of the first and second hinge pins are constructed having one conical or truncated conical gear connected thereto;
a third, hinge pin mounted on said frame for rotation about a third axis of rotation transverse to said first and second axes of rotation, said third hinge pin having two conical or truncated conical gears connected thereto, said conical or truncated conical gears of said third hinge pin being coupled to the conical or truncated conical gears of the first and second hinge pins so that rotational movement of the first hinge pin is transferred to the second hinge pin via the coupled conical or truncated conical gears of the third hinge pin to synchronize the relative movement of the first and second elements.

9. A mobile communications device as in claim 8 wherein the first and second sections comprise a first position with the keypad and display being closed by the first and second sections, a second position with the second section rotated about 180 degrees relative to the first section such that the first section is substantially inline with the second section and a hinge frame of the hinge, and a third position with the second section rotated about 360 degrees relative to the first section and having the keypad and display located on opposite exterior facing sides of the mobile communications device.

10. A mobile communications device as in claim 8 further comprising a flex circuit extending across the hinge and electrically connecting electronic circuitry in the first section to electronic circuitry in the second section.

11. A mobile communications device as in claim 8 wherein the connection comprises a detent locating system for locking the position of the second section relative to the first section at an intermediate position between a fully closed position and a 360 degree fully open position.

* * * * *